(12) United States Patent
Wasserblat et al.

(10) Patent No.: US 7,801,288 B2
(45) Date of Patent: \*Sep. 21, 2010

(54) METHOD AND APPARATUS FOR FRAUD DETECTION

(75) Inventors: Moshe Wasserblat, Modein (IL); Barak Eilam, Hod Hasharon (IL); Oren Pereg, Ra'anana (IL); Ilan Kor, Tel Mond (IL)

(73) Assignee: Nice Systems Ltd., Ra'anana (IL)

( \* ) Notice: Subject to any disclaimer, the term of this patent is extended or adjusted under 35 U.S.C. 154(b) by 365 days.

This patent is subject to a terminal disclaimer.

(21) Appl. No.: 12/074,032

(22) Filed: Feb. 29, 2008

(65) Prior Publication Data

US 2008/0154609 A1 Jun. 26, 2008

Related U.S. Application Data

(63) Continuation of application No. 11/139,812, filed on May 27, 2005, now Pat. No. 7,386,105.

(51) Int. Cl.
*H04M 15/00* (2006.01)

(52) U.S. Cl. .................. 379/114.14; 379/145; 704/273

(58) Field of Classification Search ................ 379/67.1, 379/71, 72, 73, 80, 85, 87–88.01, 88.08, 379/88.09, 88.1, 88.16, 114.14, 145; 704/261, 704/266, 270, 273, 274, 275

See application file for complete search history.

(56) References Cited

U.S. PATENT DOCUMENTS 4,145,715 A 3/1979 Clever 4,527,151 A 7/1985 Byrne
4,821,118 A 4/1989 Lafreniere (Continued)

FOREIGN PATENT DOCUMENTS

DE 10358333 7/2005

(Continued)

OTHER PUBLICATIONS

Freedman, I. Closing the Contact Center Quality Loop with Customer Experience Management, Customer Interaction Solutions, vol. 19, No. 9, Mar. 2001.

(Continued)

*Primary Examiner*—Binh K Tieu
(74) *Attorney, Agent, or Firm*—Ohlandt, Greeley, Ruggiero & Perle, L.L.P.

(57) ABSTRACT

A fraud detection method for generating a first fraud or fraud attempt probability, within an at least one captured or recorded interaction, is provided. The method comprises a scoring step for scoring an at least one voice belonging to an at least one tested speaker in the at least one captured or recorded interaction against an at least one voice print within an at least one entry in a voice print collection, the scoring step generating an at least one probability that the at least one voice in the captured or recorded interaction belongs to an at least one second speaker associated with the at least one voice print, said at least one probability represents the probability that the at least one captured or recorded interaction is fraudulent; and an auditing step for auditing the at least one probability and the at least one captured or recorded interaction.

37 Claims, 5 Drawing Sheets

U.S. PATENT DOCUMENTS

| | | |
|---|---|---|
| 5,051,827 A | 9/1991 | Fairhurst |
| 5,091,780 A | 2/1992 | Pomerleau |
| 5,303,045 A | 4/1994 | Richards et al. |
| 5,307,170 A | 4/1994 | Itsumi et al. |
| 5,353,168 A | 10/1994 | Crick |
| 5,404,170 A | 4/1995 | Keating |
| 5,491,511 A | 2/1996 | Odle |
| 5,519,446 A | 5/1996 | Lee |
| 5,734,441 A | 3/1998 | Kondo et al. |
| 5,742,349 A | 4/1998 | Choi et al. |
| 5,751,346 A | 5/1998 | Dozier et al. |
| 5,790,096 A | 8/1998 | Hill, Jr. |
| 5,796,439 A | 8/1998 | Hewett et al. |
| 5,847,755 A | 12/1998 | Wixson et al. |
| 5,895,453 A | 4/1999 | Cook |
| 5,897,616 A | 4/1999 | Kanevsky et al. |
| 5,920,338 A | 7/1999 | Katz |
| 5,987,107 A * | 11/1999 | Brown ............... 379/114.12 |
| 6,014,647 A | 1/2000 | Nizzar et al. |
| 6,028,626 A | 2/2000 | Aviv |
| 6,031,573 A | 2/2000 | MacCormack et al. |
| 6,037,991 A | 3/2000 | Thro et al. |
| 6,070,142 A | 5/2000 | McDonough et al. |
| 6,072,493 A * | 6/2000 | Driskell et al. ............ 715/854 |
| 6,081,606 A | 6/2000 | Hansen et al. |
| 6,092,197 A | 7/2000 | Coueignoux |
| 6,094,227 A | 7/2000 | Guimier |
| 6,097,429 A | 8/2000 | Seely et al. |
| 6,111,610 A | 8/2000 | Faroudja |
| 6,134,530 A | 10/2000 | Bunting et al. |
| 6,138,139 A | 10/2000 | Beck et al. |
| 6,161,090 A | 12/2000 | Kanevsky et al. |
| 6,167,395 A | 12/2000 | Beck et al. |
| 6,170,011 B1 | 1/2001 | Beck et al. |
| 6,212,178 B1 | 4/2001 | Beck |
| 6,230,197 B1 | 5/2001 | Beck et al. |
| 6,295,367 B1 | 9/2001 | Crabtree et al. |
| 6,327,343 B1 | 12/2001 | Epstein et al. |
| 6,330,025 B1 | 12/2001 | Arazi et al. |
| 6,345,305 B1 | 2/2002 | Beck et al. |
| 6,404,857 B1 | 6/2002 | Blair et al. |
| 6,427,137 B2 | 7/2002 | Petrushin |
| 6,441,734 B1 | 8/2002 | Gutta et al. |
| 6,480,825 B1 | 11/2002 | Sharma et al. |
| 6,529,871 B1 | 3/2003 | Kanevsky et al. |
| 6,549,613 B1 | 4/2003 | Dikmen |
| 6,559,769 B2 | 5/2003 | Anthony et al. |
| 6,570,608 B1 | 5/2003 | Tserng |
| 6,604,108 B1 | 8/2003 | Nitahara |
| 6,628,835 B1 | 9/2003 | Brill et al. |
| 6,704,409 B1 | 3/2004 | Dilip et al. |
| 6,760,701 B2 | 7/2004 | Sharma et al. |
| 7,076,427 B2 | 7/2006 | Scarano et al. |
| 7,103,806 B1 | 9/2006 | Horvitz |
| 2001/0043697 A1 | 11/2001 | Cox et al. |
| 2001/0052081 A1 | 12/2001 | McKibben et al. |
| 2002/0005898 A1 | 1/2002 | Kawada et al. |
| 2002/0010705 A1 | 1/2002 | Park et al. |
| 2002/0059283 A1 | 5/2002 | Shapiro et al. |
| 2002/0087385 A1 | 7/2002 | Vincent |
| 2003/0009333 A1 | 1/2003 | Sharma et al. |
| 2003/0033145 A1 | 2/2003 | Petrushin |
| 2003/0059016 A1 | 3/2003 | Lieberman et al. |
| 2003/0101348 A1 | 5/2003 | Russo et al. |
| 2003/0128099 A1 | 7/2003 | Cockerham |
| 2003/0163360 A1 | 8/2003 | Galvin |
| 2004/0098295 A1 | 5/2004 | Sarlay et al. |
| 2004/0141508 A1 | 7/2004 | Schoeneberger et al. |
| 2004/0161133 A1 | 8/2004 | Elazar et al. |
| 2004/0225499 A1 | 11/2004 | Wang et al. |
| 2004/0249650 A1 | 12/2004 | Freedman et al. |
| 2005/0234727 A1 | 10/2005 | Chiu |
| 2005/0278192 A1 | 12/2005 | Cantini et al. |
| 2006/0093135 A1 | 5/2006 | Fiatal et al. |

FOREIGN PATENT DOCUMENTS

| | | |
|---|---|---|
| EP | 1 484 892 | 8/2004 |
| GB | 9916430.3 | 7/1999 |
| IL | 03 067884 A1 | 8/2003 |
| WO | WO 95 29470 A | 11/1995 |
| WO | WO 98 01838 A | 1/1998 |
| WO | WO 00/73996 | 12/2000 |
| WO | WO 02/37856 | 5/2002 |
| WO | WO 03 013113 A2 | 2/2003 |
| WO | WO 03/067360 A2 | 8/2003 |
| WO | WO 03 067360 A2 | 8/2003 |
| WO | WO 03 067884 A1 | 8/2003 |
| WO | WO 2004 091250 | 10/2004 |

OTHER PUBLICATIONS

PR Newswire, Nice Redefines Customer Interactions with Launch of Customer Experience Management, Jun. 13, 2000.

PR Newswire, Recognition Systems and Hyperion to Provide Closed Loop CRM Analytic Applications, Nov. 17, 1999.

Financial companies want to turn regulatory burden into competitive advantage, Feb. 24, 2003, printed from InformationWeek, http://www.informationweek.com/story/IWK20030223S0002.

SEDOR—Internet pages form http://www.dallmeier-electronic.com.

(Hebrew) print from Haaretz, "The Computer at the Other End of the Line", Feb. 17, 2002.

Article Sertainty—Agent Performance Optimization—2005 Se Solutions, Inc.

Lawrence P. Mark SER—White Paper—Sertainty Quality Assurance—2003-2005 SER Solutions Inc.

Douglas A. Reynolds Robust Text Independent Speaker Identification Using Gaussian Mixture Speaker Models—IEEE Transactions on Speech and Audio Processing, vol. 3, No. 1, Jan. 1995.

Chaudhari, Navratil, Ramaswamy, and Maes Very Large Population Text-Independent Speaker Identification Using Transformation Enhanced Multi-Grained Models—Upendra V. Chaudhari, Jiri Navratil, Ganesh N. Ramaswamy, and Stephane H. Maes—IBM T.j. Watson Research Centre—Oct. 2000.

Douglas A. Reynolds, Thomas F. Quatieri, Robert B. Dunn Speaker Verification Using Adapted Gaussian Mixture Models—Oct. 1, 2000.

A tutorial on text-independent speaker verification—Frederic Bimbot, Jean Bonastre, Corinn Fredouille, Guillaume Gravier, Ivan Chagnolleau, Sylvian Meigner, Teva Merlin, Javier Ortega Garcia, Dijana Deacretaz, Douglas Reynolds—Aug. 8, 2003.

Frederic Bimbot et al—A Tutorial on Text-Independent Speaker Verification EURASIP Journal on Applied Signal Processing 2004:4, 430-451.

Amir, et al. "Towards an Automatic Classification of Emotions in Speech"; ICSLP (1998); Paper 0199.

* cited by examiner

METHOD AND APPARATUS FOR FRAUD DETECTION

BACKGROUND OF THE INVENTION

1. Field of the Invention

The present invention relates to voice analysis in general and to a method and apparatus for fraud detection in particular.

2. Discussion of the Related Art

Acts of fraud are occurring in ever growing numbers and are becoming a serious problem, harming innocent people, services or goods suppliers, public safety personnel, and credit companies. Fraud and fraud attempts, including theft identities occur in all sectors such as financial institutes, public safety services, insurance or the like. In financial markets, significant harm is created by direct financial loss due to lost goods, lost working hours and expenses on one hand, and distress, shame, credit loss and inconvenience on the other hand. In the public safety domain, frauds can harass, but can also danger life as well as property. Over 9 million people became victims of identity theft in the year 2004 in the United States alone. Common identity theft actions include using false identity when consuming phone or wireless services, using a stolen name, date of birth, or social security number to open a new credit card account, and opening a checking account under a stolen identity. Identity thefts account for 3.23 millions cases per year with an average damage of USD10,200 per victim. Around 60% of all fraud actions involving existing accounts and credit cards take one week to over six months to be discovered. This long time frame, which is mainly due to the long billing cycle, enables perpetrators to commit multiple fraud actions before suspicion arises. Currently available credit card fraud detection and prevention systems are based on: early alert, when the card holder is aware of the identity theft; usage of mutual repository database of suspects or credit card numbers; and noticing transactions which are incompatible with the card holder's profile, in terms of time, location, purchased goods, etc. However, these methods are of little use when no alert of stolen identity is available, such as when a stolen identity is used for opening a new account or obtaining a new credit card.

There is therefore a need for a novel method and apparatus that in addition to the currently available methods and systems will reduce the number of fraud actions in general and identity thefts in particular. The method and system should also be able to shorten the time it takes to expose additional fraud actions and fraud attempts, and preferably to even uncover them before the interaction is over.

SUMMARY OF THE PRESENT INVENTION

It is an object of the present invention to provide a novel method for an apparatus and method for detecting interactions capturing fraud attempts which overcome the disadvantages of the prior art. In accordance with the present invention, there is thus provided a fraud detection method for generating a first fraud or fraud attempt probability, within one or more captured or recorded interactions, the method comprising the step of scoring one or more voices belonging to one or more tested speakers in the captured or recorded interaction against one or more voice prints within one or more entries in a voice print collection, the scoring step generating a probability that the one or more voices in the captured or recorded interaction belong to one or more second speakers associated with the one or more voice prints, said probability represents the probability that the one or more captured or recorded interaction is fraudulent. Within the method, the probability generated at the scoring step represents the similarity between the voice of the tested speaker and the voice of the at least one second speaker, said second speaker can be a fraudster, a legitimate speaker, or allegedly the tested speaker. The method further comprising a fraud probability generation step, for enhancing the first fraud or fraud attempt probability. The fraud probability generation step employs a rule engine activating one or more rules or using one or more thresholds set by a user of the method. The rules or the thresholds can involve data associated with: the captured or recorded interaction, a speaker thereof, an at least one other interaction of the speaker thereof, the one or more voice prints or the one or more second speakers. The rules or the thresholds can be set dynamically. The method can further comprise: a second scoring step for determining a second scoring result by scoring the one or more voices against a background model; and a normalizing step for normalizing the first scoring result with the second scoring result. Within the method, the scoring step can comprise scoring the one or more tested voices against two or more voice prints, thus obtaining two or more score results. When scoring against two or more voice prints, the method can further comprise a score-test normalization step, for normalizing the at least two score results. Within the method, one or more voice prints or data associated with the voice prints or with the second speaker is stored in a collection. The method can further comprise a retrieving step for retrieving one or more second interactions, and a construction step for constructing the at one or more voice prints from the one or more voices participating in the one or more second interactions. The method can further comprise a step of retrieving one or more voice prints or data associated with the one or more voice prints. When retrieving a voice print, the method can further comprise a filtering step for filtering a collection to retrieve the one or more voice prints such that data associated with the voice prints is related to data associated with the recorded or captured interaction. The filtering can be based on an at least one of: area code of calling number, gender of speaker, age of speaker, language spoken. The step so of the method can be performed in real-time. The method can further comprising a pre processing step for pre processing the captured or recorded interaction or the second interaction. The pre processing step can comprise one of: compressing; decompressing; segmenting; separating speakers; identifying the agent side; and receiving data related to the captured or recorded interaction or to the second interaction. The additional data can comprise computer telephony integration information. The method can further comprise a selection step for selecting one or more selected interactions to be transferred to the scoring step, and associating the one or more selected interactions with one or more second fraud or fraud attempt probabilities. Within the method, the selection step can comprise one or more of the following: applying one or more rules by a rule engine; auditing interactions; filtering interactions using one or more filtering engines. The filtering engines can comprise one or more of the following: emotion detection, word spotting, speech to text, interaction analysis, and data risk analysis. Within the method, the second fraud or fraud attempt probability represents a risk level associated with the one or more selected interactions. The selection step can employs one or more rules or one or more thresholds set by a user of the method. The rules or thresholds can involve data associated with one or more of the following: the captured or recorded interaction; a speaker thereof; other interactions of the speaker thereof; the one or more voice prints or the at least one second speaker. The one or more rules or one or more thresholds can set dynamically. The method can further comprise a weighting step for generating a combined fraud attempt probability from the first and the second fraud attempt probabilities. The method can further comprise an alert-generation step for generating an alert if said first fraud or fraud attempt probability or said second fraud or fraud attempt probability or a combination thereof exceeds a predetermined threshold. The alert can be sent to an agent or another contact associated with the captured or recorded interaction. The method can further comprise a reporting step for generating or updating a report comprising details of the one or more captured or recorded interactions if the first fraud or fraud attempt probability or the second fraud or fraud attempt probability or a combination thereof exceeds a predetermined threshold. The method can further comprise an auditing step for auditing the report. The auditing step can comprise one or more of the following: listening to calls; reviewing interactions; reviewing history of one or more speakers participating in one or more interactions; listening to previous interactions of speakers participating in one or more interactions appearing in the report, or filling forms. The method can further comprise a step of interaction capturing or logging. The method can further comprise a step of a-posteriori analysis for one or more of the following: adapting one or more parameters or one or more rules or one or more thresholds used by the method, trend analysis, pattern of behavior recognition, selecting one or more filtering engines.

Another aspect of the disclosed invention relates to a method for constructing a voice print collection, the method comprising the steps of: receiving one or more suspect voice samples; extracting characteristic features from the one or more voice sample, thus generating one or more sequences of feature vectors; constructing a voice print from the one or more sequences of feature vectors; and storing the voice print in a collection. The method can further comprise a storage step for storing data in the collection, said data associated with the at least one voice print, or with the at least one voice sample, or with an at least one speaker participating in the voice sample. The method can further comprise a normalization step for generating score normalization parameters to be used when scoring one or more voice samples against one or more voice prints from the collection Yet another aspect of the disclosed invention relates to a fraud detection apparatus for generating a fraud or fraud attempt probability, within one or more captured or recorded interactions, the apparatus comprising: a voice print collection comprising one or more entries, each entry comprising a voice print or data associated with the voice print, said voice print is constructed from a voice known or suspected as belonging to a fraudster; and a scoring component for scoring one or more voices in the captured or recorded interaction against the voice print within the one or more entries, the component generating a probability that the one or more voices in the one or more captured or recorded interaction belong to one or more persons associated with the one or more voice prints, said probability represents the probability that the one or more captured or recorded interaction are fraudulent.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

Figure 1:
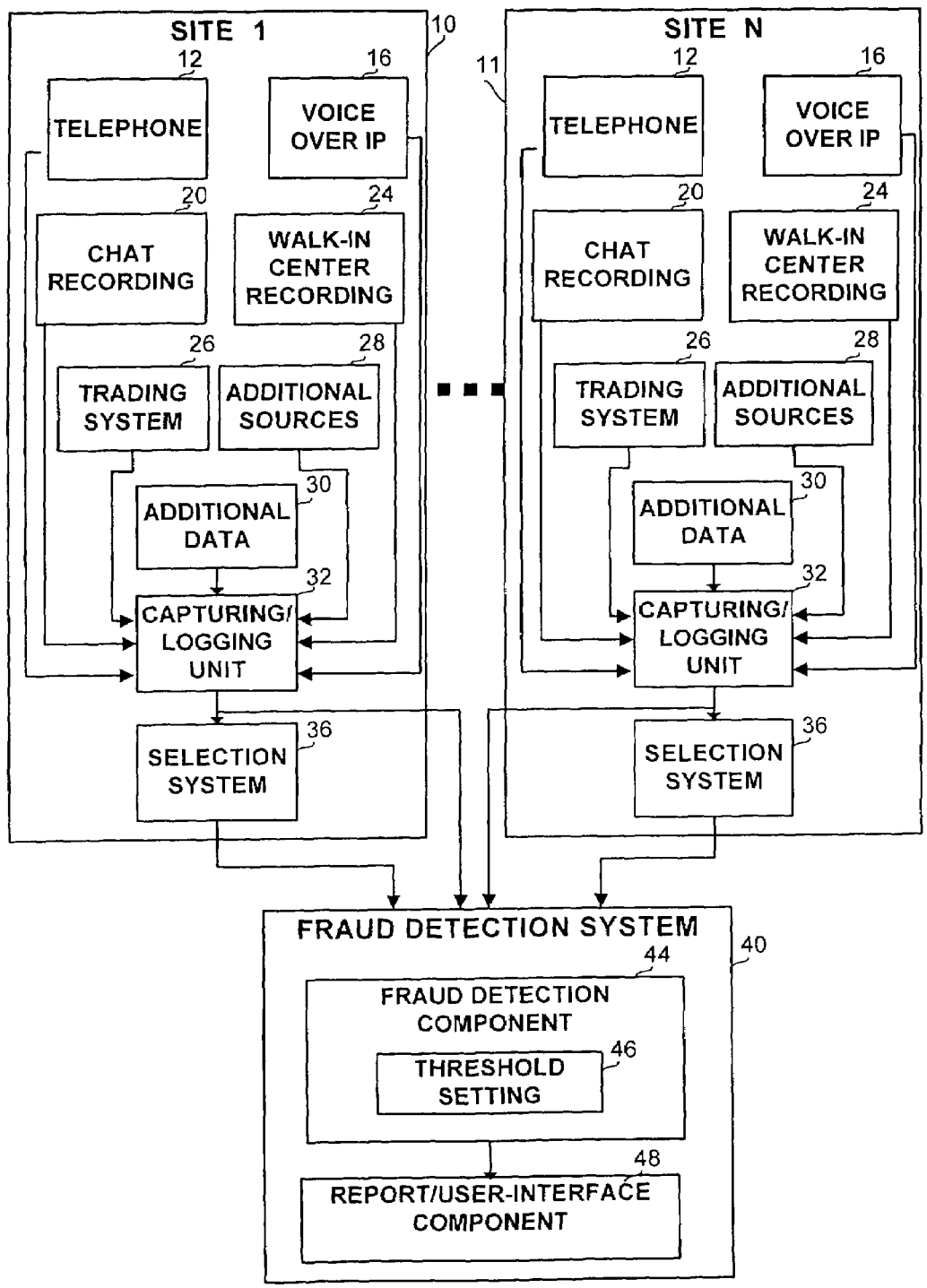
FIG. 1 is a schematic block diagram of a typical environment in which a preferred embodiment the present invention is used.

The present invention relates to international patent application serial number PCT/IL03/00300 titled APPARATUS, SYSTEM AND METHOD FOR DISPUTE RESOLUTION, REGULATION COMPLIANCE AND QUALITY MANAGEMENT IN FINANCIAL INSTITUTIONS, filed on Apr. 9, 2003, and to U.S. patent application titled APPARATUS AND METHOD FOR AUDIO ANALYSIS filed on Mar. 17, 2005, and to U.S. patent application Ser. No. 10/996,811 titled METHOD AND APPARATUS FOR SPEAKER SPOTTING filed on Nov. 23, 2004, and to international patent application serial number PCT/IL02/00741 titled QUALITY MANAGEMENT AND RECORDING SOLUTIONS FOR WALK-IN ENVIRONMENTS, filed on May 9, 2002, the full contents of which are incorporated herein by reference.

The present invention overcomes the disadvantages of the prior art by providing a novel method and apparatus which enhance and add to the capabilities of currently available systems for fraud detection in general and identity theft in particular. Identity theft relates to actions in which the fraudsters is impersonating to be another person, by stating details of the other person, such as ID number, social security number, date of birth or the like, by presenting stolen or false documents, or any other method.

The disclosed invention provides an apparatus and method for decreasing the time between the execution of an identity theft and its detection, by identifying interactions executed by known fraudsters.

The present invention uses data collected prior to, during, or subsequent to the occurrence of interactions in which the participants' voices are captured and possibly logged. The used data includes procedural data, such as the essence of the transaction, date, time, location if available, number called or number called from in the case of a telephonic interaction, and the like. In addition, the interaction is captured and possibly logged, so that the voices of the persons participating in the interaction are available. At a first stage, the interaction or the accompanying technical information are optionally processed in order to collect fraudulent calls, i.e. calls which might indicate a fraud attempt. The processing can be manually executed by a person such as a compliance officer considering the information automatically, by considering rules, meta data associated with the interactions or results of engines processing the interactions, or a combination of automatic and manual processing. The suspected calls are assigned a first fraud probability, or a risk level, and are then passed to a second stage performed by a fraud detection component. For a non-limiting example, the system can be tuned to transfer to the fraud detection component only calls that deal with account opening, calls that deal with address changing, calls in which a substantial degree of emotion was detected, calls with specific CTI events, such as multiple hold events, DNIS, VDN, ANI, number dialed, number dialed from or the like. Other factors affecting the portion of the interactions volume that will be analyzed can involve words spotted in the interaction, high emotion of either side of the interaction, external metadata of the calls, business data, screen recorded activity, user (agents) manually tagging the calls during the interactions, files tagging by external data, or the like. The fraud detection component performs voice parameterization of the voice, i.e. extracts the characteristics of the voice. If possible, the fraud detection component then preferably scores the voice characteristics against a voice print which was constructed from the voice characteristics of the same alleged customer, for example one of the account owners in a financial organization, or a person who identified himself through PIN, SSN or any other external or internal data as a legitimate speaker, for verification purposes. In the context of the present invention, the result of the scoring represents the probability that the customer's voice sample belongs to the voice print against which it was scored. The scoring preferably includes a normalization stage, at which the score is compared to the result of scoring the voice characteristics against a general voice print. The general voice model is a background model, constructed from multiple relevant voices, such as customers' voices, voices of the same gender, or the like. If the score is below a certain threshold, there is a significant probability that the person involved in the interaction is not the same person for which an earlier interaction was recorded. In such case, the voice characteristics are scored against a reservoir of voice prints of known fraudsters. The resulting score represents the probability that the customer's voice sample belongs to any of the fraudster's voice print. Alternatively, the customer's voice sample is scored against one or more voice prints, which are selected from the fraudster collection as having similar characteristics with the customer's voice sample at hand. The characteristics can include characteristics stemming from the capturing or the recording systems, such as callers details, CTI information and other tagged business data, as well as characteristics obtained from external sources, such as account number, area, age or the like, and characteristics obtained from the voice itself, such as gender. If a combination of the first fraud probability and the score between the customer's voice sample and the fraudster's voice print contained in the reservoir exceeds a predetermined threshold a high probability that the speaker in the interaction is a known fraudster, and that the interaction is fraudulent is assumed, and a notification, such as an alert or a report is issued for the interaction and steps are taken to control or contain the damage caused by the fraudster. A supervisor or another person is preferably prompted to audit reported interactions. During the scoring stage against the collection, the system preferably further grades the probabilities resulting from scoring a customer's voice sample against the one or more voice prints in the reservoir. The threshold above which a notification is issued for an interaction depends on the resources the user is willing to dedicate to checking the alerts on one hand, and on the implications of unhandled identity thefts on the other hand. Other factors considered in setting the thresholds include considering the status of the customer, the status of the interaction, the importance or the volume of the interaction, the sensitivity of the interaction to the organization, the relative frequency of interactions of the same order of magnitude in the account as well as variations in the same, the sensitivity of the account or the account holder, or the like. For example, a large transaction of a VIP customer in a financial institution will be assigned lower thresholds than other transactions, in order to increase the catching probability of a fraud attempt. In general, the more important the interaction or the customer—the lower the thresholds are set, so that fraud attempts are more likely to be caught. The thresholds are preferably set in a dynamic manner according to interaction metadata and data collected from the interaction itself. The fields, as well as the values, according to which the thresholds are set can be determined dynamically. Testing a voice sample against fraudsters voice prints is extremely fast, therefore the result, i.e. the fraud attempt probability is possibly available shortly after an interaction was executed, or even before it ended, thus limiting further damage by closing the credit line, canceling the account or the like. The thresholds determination rules and values above which calls are transferred to the scoring system are determined by the site's requirements and available resources. Either at the first stage or at the second stage, the voice is preprocessed. Preprocessing optionally includes any one or more of the following: decompression in case the voice is compressed; removal of non-speech segments using an automatic algorithm for speech/non-speech detector or other indications like CTI information such as hold events; separating the speakers; and selecting one of the sides if the two (or more) speakers were captured together, for example the customer side in a telephone call between a customer and a service center. The apparatus and method are efficient, since they enable users to focus on those interactions that pose the greatest threats to their business, for example opening a new account, changing details of an existing account, expanding account credit balance, upgrading account, or the like. The disclosed system and apparatus can be operated in conjunction with a capturing or logging system, or as an independent solution receiving calls from a third party.

Referring now to FIG. 1, showing a non-limiting environment in which the present invention is used. A typical user of the invention is a single- or multiple-site organization, such as a bank, a credit card operator, a chain of department stores having their own credit cards, a call-center, an emergency center, an insurance claims operator, or any other organization that performs financial transactions with customers or is likely to have to verify incoming callers' identity. The number of sites used in the present invention is not limited. The system typically employs a voice and data capturing and logging component at each site, responsible for collecting voice and optionally additional data relating to customer interactions from all relevant sources. In FIG. 1, site 1 10 and site N 11 are typical sites of a multi-site organization, for example a bank branch of a national bank. The components shown in each site are not necessarily identical, and each site comprises the input sources and input capturing mechanisms relevant to the activities supported by the site. The possible sources employed at site 110 include telephone 12, which is a means by which a substantial number of transactions are performed daily, many of which are also captured. Another source of interaction voices are voice-over-IP systems 16 which are taking growing market segments. An additional source is a recording of a vocal chat performed over the internet 20. Yet other sources of vocal transactions are captured interactions performed at walk-in-canters 24, such as recordings performed at a teller's counter at a bank, and recordings from trading systems 26. Additional sources of vocal include microphones, intercom, vocal input by an external system, or the like. The sources of vocal information are not limited to the abovementioned sources, and any additional source of vocal information 28 which can be captured, can be used. Additional data 30 is captured, comprising for example PABX or CTI data including claimed identity of customer, number called or number called from in the case of telephonic interaction, handling agent, hold periods or transfers, business data such as account number or claim number, or the like. Another example for additional data 30 is screen events, containing information such as the interaction subject as entered by the handling agent, image or video data, and products of processing the same, such as recognized face or the like. All the captured voice and data are logged by logging component 32. The capturing and logging mechanisms are specific for each type of source, and are described for example in international patent application serial number PCT/IL02/00741 titled QUALITY MANAGEMENT AND RECORDING SOLUTIONS FOR WALK-IN ENVIRONMENTS, filed on May 9, 2002, and international patent application serial number PCT/IL03/00300 titled APPARATUS, SYSTEM AND METHOD FOR DISPUTE RESOLUTION, REGULATION COMPLIANCE AND QUALITY MANAGEMENT IN FINANCIAL INSTITUTIONS, filed on Apr. 9, 2003. Logging component 32 provides a device for recording the interactions on a temporary or permanent media, such as a memory, a magnetic tape, a magnetic disc, an optical disc, a laser disc, a mass-storage device, or the like. Each site further comprises a selection system 36 for assigning a fraud probability to each interaction, and selecting those interactions that are more suspected as contain fraud action or fraud attempt than others, i.e., their fraud probability exceeds a predetermined threshold. For those selected interactions, there is often a need to identify at least one of the speakers. For example, in a call center that speaker would usually be the customer. If there is a significant probability that the tested speaker is a known fraudster, that will have a large contribution to the ability to contain or control possible damages. Alternatively, if the tested speaker is verified to a high degree to be who he or she is claiming to be, that will remove doubts about the credibility of an interaction. Preferably all, or substantial part of the captured and logged data is transferred to selection system 36. In an alternative embodiment, selection system 36 can serve multiple sites and select suspicious calls from all sites connected to it. Selection system 36 is further detailed in association with FIG. 3 below. Once the suspicious calls had been selected from the sites, the calls with their associated fraud probabilities are transferred to fraud detection system 40. Typically, each organization comprises one or more fraud detection system 40. The number of employed selection systems 36 and fraud detection systems 40 determines the capacity of the apparatus. Fraud detection system 40 comprises a fraud detection component 44 that checks each interaction transferred by any of selection systems 36 and issues a combined fraud probability for the interaction, taking into account the results generated by fraud detection component 44 and the fraud probability as assigned by selection system 36. Fraud detection component 44 further comprises a threshold determination component 46 for controlling the tradeoff between false alarms and miss detected in the system. The higher the value the fraud threshold is set to, the fewer false alarms occur, i.e., less innocent cases reported as fraud attempt are likely to occur, while the system is more likely to miss real fraudsters. However, if the threshold is set too low, more fraud attempts are likely to be discovered, together with more false alarms. The preference of a customer is affected by the price of the resources required to handle false alarms, vs. the expected cost of a miss detect, i.e., a real fraud action. Therefore, the thresholds are configurable by each customer, and can even be set differently for specific cases. The setting can be dynamic, static, or a combination thereof. For example, the system can be set such that the threshold relevant for opening an account is lower than the threshold relevant for other transactions, thus causing more false alarms but also higher detection rate for opening accounts. The threshold can also be automatically set per transaction or interaction according to the transaction business value, account or called number sensitivity, alerts on the account or the called number, the account holder service level, account holder credit history or any other underlying rule, guideline or policy the user wishes to configure the system according to. Setting the rules in a dynamic manner will allow each organization to set its own threshold policy according to meta data or extracted data associated with each transaction or interaction. The threshold setting can also involve data extracted form the interaction itself, such as spotted words, level of emotion or the like. Once each interaction is processed, a policy manager component will set the threshold for this interaction according to policy rules as set by the user. A notification component 48, such as a report or user interface generator is responsible for outputting the combined results, either by a report presented or sent to a user of all interactions whose combined probability exceeds a predetermined threshold, an alert generated once the combined fraud probability associated with an interaction exceeds a certain threshold, or the like. Preferably, the generated alert is sent to the source of the call or an associated authority, such as the agent who held the call or a supervisor. Since all components of the apparatus preferably work in real-time or near-real time, the alert can be presented to the agent while the call is still being held, and prompt him to take precautions. When a fraud attempt report is generated and presented to a user, the user, for example a supervisor, is provided with the possibility to audit the report, for example by listening to calls appearing in the report, assessing their status, receiving additional information such as the call history of the suspect or other calls relating to the same account, listening to previous interactions of speakers participating in an interaction appearing in the report, filling forms, entering comments, escalating findings or the like. The procedure of defining the audit process is dynamic and can be set by a system administrator, security officer or the like in each organization. All components of the system, including capturing components 12, 16, 20, 24, and 28, selection systems 36, fraud detection system 44 and report/user interface component 48 preferably comprise one or more computing platforms, such as a personal computer, a mainframe computer, or any other type of computing platform that is provisioned with a memory device (not shown), a CPU or microprocessor device, and several I/O ports (not shown). Alternatively, each component can be a DSP chip, an ASIC device storing the commands and data necessary to execute the methods of the present invention, or the like. Each component can further include a storage device (not shown), storing the relevant applications. Each application is a set of logically inter-related computer programs and associated data structures that interact to perform one or more specific tasks.

Figure 2:
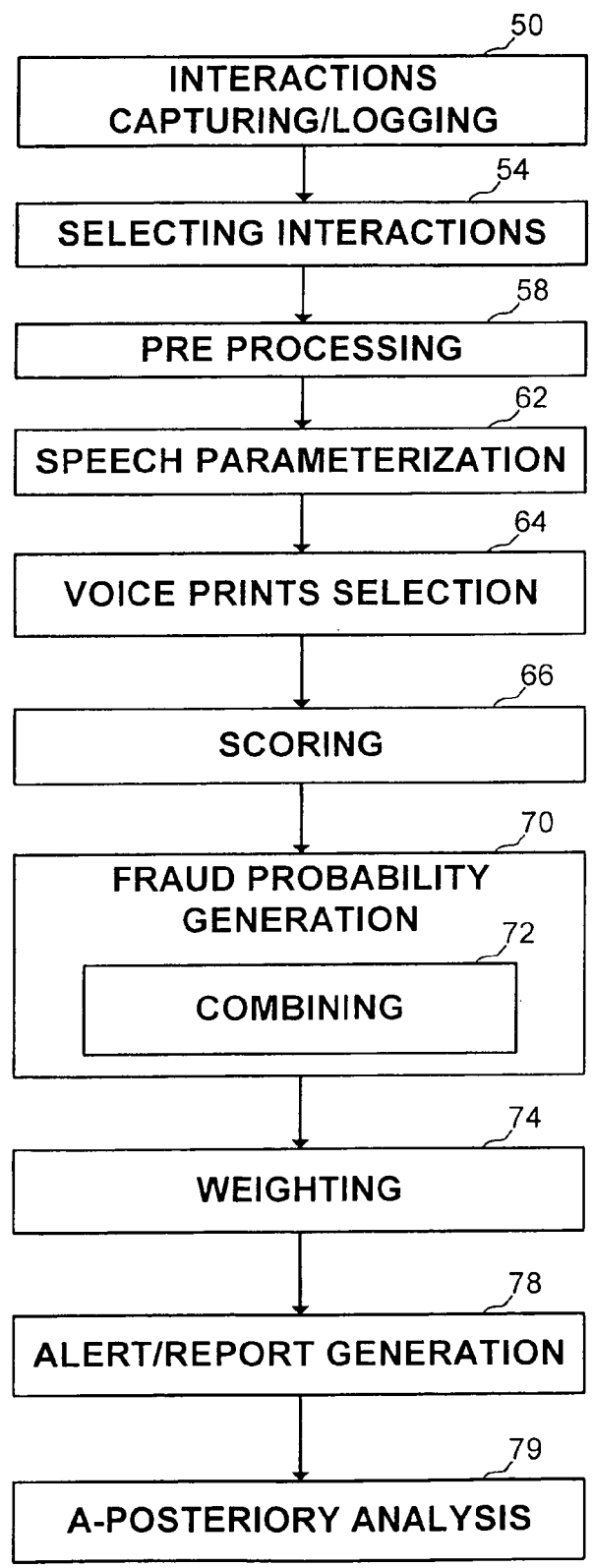
FIG. 2 is a schematic flowchart of the fraud detection method, in accordance with the present invention.

Referring now to FIG. 2, showing a preferred embodiment of the method of detecting a fraud or a fraud attempt captured in an interaction. For clarity reasons, the described interaction is a telephone conversation between an agent and a customer. However, persons skilled in the art will appreciate that the method can be adapted to any other relevant domain with little or no enhancements. At step 50, all or part of the interactions associated with a customer site, such as a call center, a service center, a financial institute or the like, are captured for analysis and preferably recorded for later retrieval. At step 54, specific interactions are selected as being suspected for capturing or conveying fraud actions or fraud attempts. The selection process optionally involves activating a rule engine, filtering engines or manual selection of calls through the usage of an auditing system. The filtering engines can comprise emotion detection, word spotting, speech to text, interaction analysis, data risk analysis, video analysis, image analysis or the like. The selection process is further detailed in association with FIG. 3 below. The interactions selected at selection step 54 for further analysis, are optionally assigned with a fraud probability determined by the tools involved in the selection process. At step 58, pre processing is performed on the selected interactions, for enhancing their quality for further analysis. Optionally, the preprocessing is performed prior to, or as a part of selection step 54. The preprocessing step preferably includes decompressing the interaction, speech/non-speech segment detection, segmenting the interaction, separating the speakers within the interaction, and identifying the sides of the interaction, i.e. determining which side is the agent and which is the customer. The preprocessing preferably uses additional data related to the call, such as Computer Telephony Integration (CTI) information. The preprocessing step is further detailed in association with FIG. 5 below. At step 62, the voice of the tested speaker is parameterized, by constructing a sequence of feature vectors, wherein each feature vector relates to a certain point in time, from the enhanced voice, wherein, each feature vector comprises a plurality of characteristics of the voice during a specific time frame within the interaction. At step 64, one or more previously constructed voice prints are selected from a collection, or a reservoir, such that the parameterized voice sample of the tested speaker would be scored against these voice prints. The selected voice prints can include a voice print of the alleged speaker of the current voice sample, who is a legitimate speaker, in order to verify that the alleged customer is indeed the true customer as recorded, for example at the time the account was opened. Alternatively the selected voice prints can include voice prints, such as voice prints from a fraudster's reservoir, whose associated data is related to data associated with the voice sample of the current interaction, such as voice prints of the same gender, same area code or the like. The voice can be scored against multiple voice prints, including voice prints of the alleged speaker or speakers, voice print of one or more fraudsters, or any combination in any required order of the above. The system allows the user to set the policy rules regarding the data to be considered from each interaction, and the filtering criteria for voice prints in the voice collection database, in a completely dynamic manner. The selection can be set manually according to policy rules or automatically. The information used for selecting the voice prints can relate to any meta data associated with the interaction or data extracted from the interaction itself, such as spotted words, emotion levels or the like. In yet another preferred embodiment, all voice prints in the reservoir are selected. At step 66, the time sequence feature vector extracted from the voice sample is scored against the one or more selected voice prints selected at step 64. When the voice sample is scored against a voice print constructed from an earlier interaction with the same alleged customer, the system assesses the probability that the caller voice sample matches the previous voice print stored in the system, thus verifying that the caller is the same caller identified in previous calls, and thus the fraud attempt probability is significantly reduced. Alternatively, a new voice print is constructed on the fly from retrieved recorded interactions of the alleged caller. The scoring process is further detailed in association with FIG. 3 below. In a preferred embodiment, the parameterized voice sample can first be scored against a voice print of the same alleged customer, and only if the score result is low, i.e., there is a high probability that it is not the same speaker, the voice is scored against part or all of the voices in the collection, which belong to known fraudsters. The voice prints in the selection against which the voice is scored are preferably filtered according to data associated with the interaction, such as area code of calling number, gender, age, language or the like. At step 70, the results of the scoring between the voice sample and the one or more voice prints from the fraudster collection are enhanced. At step 70, the results are possibly vertically normalized, and graded or otherwise combined at sub-step 72 into a single fraud probability. The functionality of step 70 is detailed in association with FIG. 3 below. At step 74, the fraud probability generated at step 70 is weighted or otherwise combined with the fraud probability assigned to the interaction at selection step 54, if selection step 54 was performed, thus generating a combined fraud probability. If the combined fraud probability exceeds a predetermined threshold, an alert is generated at step 78 for the interaction and preferably sent to the agent handling the interaction, a supervisor, a fraud researcher, a compliance officer or any other contact as defined in the notification rules of the system. The notification policy, including the thresholds and the action to be taken can be set according to the interaction sensitivity, transaction value, risk grade, fraud confidence level, structural organization, or any other notification policy that the user wishes to set. Since all steps are preferably performed in real-time, an alert can be generated even before the interaction is completed, thus giving the agent or supervisor an option to control and reduce possible damages. Alternatively, a report is generated for all interactions assigned with a combined fraud probability exceeding a predetermined threshold, and a supervisor or another person associated with the call center is prompted to audit the report. Auditing the report comprises listening to calls, reviewing interactions, reviewing history of speakers participating in an interaction, listening to previous calls of speakers participating in the interaction, filling forms or the like. The structure of the form and the integrated audit procedure can be set dynamically by a site administrator, a compliance officer or the like. Step 79 is preferably performed after a predetermined time during which the system was working and assigning fraud probabilities to interactions, At a-posteriori analysis step 79 the system analyses and tries to find common denominators to calls that were analyzed and assigned a high probability of conveying or capturing fraud attempts, or calls that were reported by a user as capturing fraud attempts, or the like. The purpose of the analysis is fine tuning of the parameters, rules and thresholds used throughout the method. Another product of the a-posteriori analysis step can be analyzing trends, obtaining insights regarding fraud methods, recurring vocabulary, time of calls, prosody patterns, calling scenario, and the like.

Figure 3:
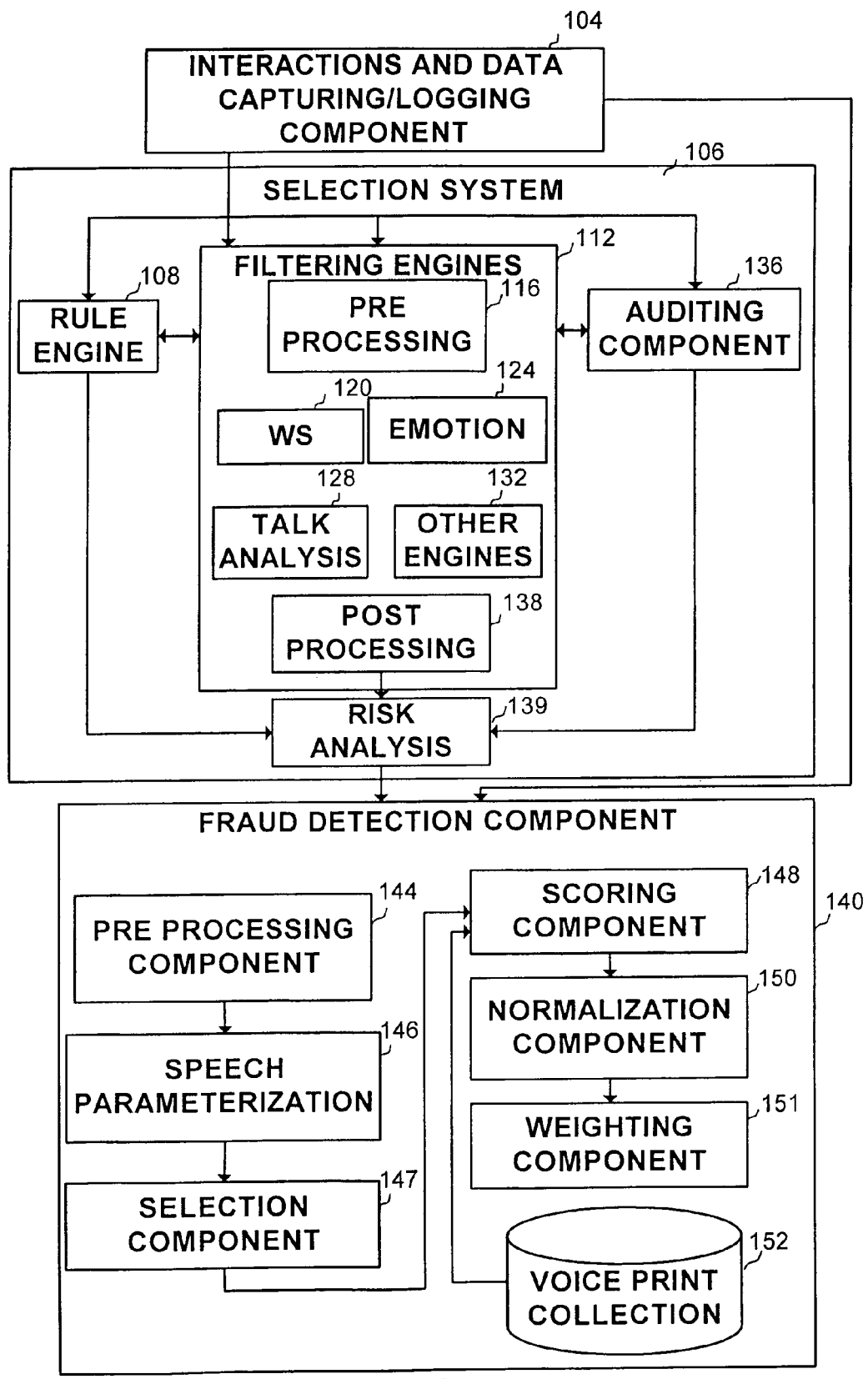
FIG. 3 is a schematic block diagram of the selection system and the fraud detection system, in accordance with the present invention.

Referring now to FIG. 3, which is a schematic block diagram of a preferred embodiment of the proposed apparatus. All components of the proposed apparatus can analyze a call in real-time or near real-time, thus providing a fraud probability for a call while the call is still on-going or shortly after. The fraud probability, especially if exceeding a predetermined threshold can be transferred back to the agent, to a supervisor, or to any other entity which can practice precautions. An interactions and data capturing or logging component 104, as detailed in association with sources and capturing mechanisms 12, 16, 20, 24, 28 and 30 and logging unit 32 of FIG. 1, is responsible for capturing part or all of the interactions taking place in one or more sites, for example a service center, a financial institute such as a bank, an emergency center, an insurance organization or the like, and associated data such as CTI information, images, video and data associated thereof or the like. The captured and logged calls and additional information are then processed by a selection system 106, in order to identify calls that should be further investigated, since these will suggest a possibility of a fraud attempt. Selection system 106 optionally comprises an auditing component 136, which enables a user, such as a compliance officer to listen to calls and mark selected calls. Auditing component 136 provides the user with appropriate user-interface and tools to select calls for listening, to assign a score to a call or to route a call to further processing. Additionally, auditing component 136 enables a user to fill up a customized form for the auditing process, including for example a conversation topic, a status such as new, confirmed, rejected, in process, or the like. The user can also integrate the organization validation and risk analysis methods into the auditing process and risk analysis scoring. Selection system 106 further comprises a rule engine 108, which marks calls that might be suitable for further examination, according to pre-determined rules, such as call subject (if available), number called from, or any other data item or combination of data items associated with the call. Yet another component of selection system 36 is filtering engines 112. In the context of the disclosed invention, the term engine refers to one or more computerized components, that interact to receive input of predetermined types, perform a specific analysis on the input, and return one or more results. An engine can comprise software components, firmware, i.e., DSP components, hardware components or any combination thereof. Filtering engines 112 comprise one or more engines, for detecting information embedded within the voice itself, which can offer further information related to the risk level associated with the interaction or with the voice. In addition to these engines, filtering engines 112 preferably comprises a pre processing engine 116, designed to enhance the captured voice and prepare the captured voice for usage by other engines. Pre processing engine 116 is further detailed in association with FIG. 5 below. Filtering engines 112 further comprise a word spotting (WS) engine 120, which searches the voice for occurrences of words or phrases from a predefined list. Engine 120 preferably supplies for each word found, the position within the call at which it was found, and a certainty indicator for the correctness of the finding. For example, WS engine 120 can search for the phrase "open an account", and report that the phrase was located 20 seconds form the beginning of the conversation, with certainty of 80%. Yet another available engine is an emotion detection engine 124. Engine 124 is designed to locate highly emotional segments within the conversation. Each segment is associated with an emotion level, in the range, for example of 0-100. Highly emotional segment can suggest anger on at least one side of the conversation. Alternatively it can suggest tension due to the customer practicing a fraud attempt. Yet another available engine is a talk analysis engine 128, which analyses the dynamics of the conversation, providing such details as the percentage of the time each speaker was speaking, the mutual silence periods, number of cross-talk events of each side, and the like. Additional engines 132 can comprise for example a risk analysis engine determining the risk associated with an interaction based on additional data, such as CTI information, screen information or the like. Additional engines 132 can also comprise a speech to text engine, a text analysis engine, screen analyzed events, video analyzed scene, OCR engines, additional engines or any combination of the above. Additional engines can be based on CTI information such as CTI call flow analysis including number of holds, number of transfers, queue time or the like. Post processing engine 118 can further enhance the results generated by other engines, for example by integrating results supplied by different engines, such as correlating certain spotted words with segments of high emotion and the like. It should be noted that the engines within filtering engines 112 can work in parallel, sequentially, be skipped, be activated depending on the results generated by other engines, be activated by a user, or the like. However, it is preferred that pre-processing engine 116, if present, is activated prior to other engines, and post processing engine 138 is activated consequent to the other engines. The processing components, i.e., auditing component 136, rule engine 108 and filtering engines 112 are preferably not mutual exclusive. Rather, they can cooperate and work in sequence. Depending on the engines' input requirement, an engine may use the results of other engines. For example, the user can use auditing component 136 to listen to calls selected by rule engine 108. In another example rule engine 108 can apply rules which involve results of word spotting engine 120, such as "select all calls in which the phrase "open an account" was spotted, and the customer's first name is John". The goal of the user is to set the rules, the activation order, and the thresholds so that the calls being selected are the most suspicious as being fraud attempts. Risk analysis component 139 combines the output results of auditing component 136, rule engine 108 and filtering engines 112 according to predetermined rules, weights and priorities, and assigns to each call a single risk level estimating the probability that the call is a fraud attempt. The calls whose risk factor exceeds a predetermined threshold, and the data acquired via the usage of the components of selection system 36 are transferred to fraud detection component 140. The processing power of selection system 36 and of the fraud detection system 140 has substantial influence on the selection of the components and the thresholds. If, for example the processing power of fraud detection component 140 is increased, the threshold for the fraud probability associated with calls that are transferred to component 140 can be decreased, so that fraud detection component 140 checks more calls. Component 140 optionally comprises a pre processing component 144, substantially similar to pre processing component 116 of filtering engines 112, which is detailed in association with FIG. 5 below. Pre processing component 144 is preferably activated only if pre processing component 116 of filtering engines 112 was not activated upon the calls. The output of preprocessing component 144 or of preprocessing component 116 of filtering engines 112 is a decompressed enhanced-quality sound of only the customer's side of the conversation. Fraud detection system 140 further comprises a speech parameterization construction component 146, which extracts characteristic features from the enhanced sound, and constructs a sequence of feature vectors for the customer, wherein each feature vector relates to a certain point in time. The extracted characteristics are further detailed in association with FIG. 4 below. System 140 comprises a voice print collection 152, which comprises a voice print for every fraudster's voice available to the user. Each such voice print is constructed from one or more combinations of the above-mentioned sequence of feature vectors extracted from the fraudsters' voice. System 140 further comprises a selection component 147 for selecting voice prints from voice print collection 152, for the customer's characteristics to be scored against, and a scoring component 148, which scores the characteristics of the tested voice as extracted from each call transferred by call selection system 106 against the voice prints selected by selection component 147 and outputs one or more scoring results. Selection component 147 preferably searches for an earlier voice recording or a previously constructed voice print of the same alleged customer. If a previously built voice print exists, it is used, otherwise if a voice recording can be retrieved, features are extracted and a voice print is constructed from the customer side of the retrieved interaction, thus generating on-the-fly a voice print. Then the feature vector time sequence extracted from the voice is scored against the voice print of the alleged customer. If the score exceeds a predetermined threshold, there is a high probability that the customer is indeed who he/she is claiming to be. If an earlier recording of the same alleged customer does not exist, or the scoring against a previous interaction is skipped, or the determined score is low, the feature vector time sequence is scored against all the voice prints of known fraudsters stored in voice print collection 152. If the score of the voice characteristics of the tested voice against any of the voice prints in voice print collection 152 exceeds a predetermined threshold, the implication is that there is substantial probability that the speaker executed a fraud attempt. As an alternative, the feature vector time sequence at hand is scored against part of the voice prints stored in the reservoir, according to one or more filtering criteria associated with the tested voice or the interaction, such as gender, area code, or the like, in order to save processing power and handle more calls. The process of filtering and the portion of the voice print collection the voice sampled will be scored against, is preferably determined by a set of policy rules. The voice print collection preferably comprises metadata associated with the voice print. The user has full and preferably dynamic control over the data types and the rules. The scoring process is detailed in association with FIG. 4 below. Normalizing component 150 is responsible for normalizing or grading the fraud attempts probabilities generated by comparing a customer's voice to multiple entries in the voice print collection, thus enhancing the score generated by scoring component 148. The normalization process is detailed in association with FIG. 4 below. The output of normalization component 150 is a one or more identities matching the speaker's voice, each possibly associated with a degree of confidence. The overall probability is determined by weighting component 151, taking into account the fraud probability assigned to the interaction by selection system 106 according, for example, to applied policy rules that relate to factors such as credit history of the account, the transaction value, the account value, account type, operation type, and any other dynamically configured formula by the user, and the fraud probability as assigned by combining component 150. Weighting component 151 outputs an overall risk level, or combined probability to being a fraud, associated with the interaction. For those interactions which are assigned a combined probability higher than a predetermined threshold are, a notification is issued, such as generating an alert, updating a report or the like, according to the user's requirements. Alternatively, the alert is transferred to the agent who handled, or is still handling the call, to a supervisor, or to any other notification contact, in order to issue a response as long as the fraudster might still be available. The transfer to the source of the conversation is most useful when the call is analyzed in real-time, but also when it is analyzed near-real-time or even off-line. The grading mechanisms of selection system 106, of combining component 150, and the weighting component 151 depend on the user's requirement and resources. It should be noted that the more calls the system will examine, and the more voices each suspected call is scored against—the higher the chances to catch a fraudster. In a typical environment, only those interactions which are assigned high fraud probability by selection system 106 are transferred to fraud detection component 140. In an alternative embodiment, selection system 106 is not activated, thus making the combined probability equal to the probability assigned by combining component 150. This embodiment requires high processing power, since it involves processing all interactions by fraud detection system 140, rather than a portion of them, as determined by selection system 106. When processing power is unlimited, substantially all interactions are processed by all filtering engines 112, and substantially all interactions are transferred to fraud detection component 140.

Figure 4:
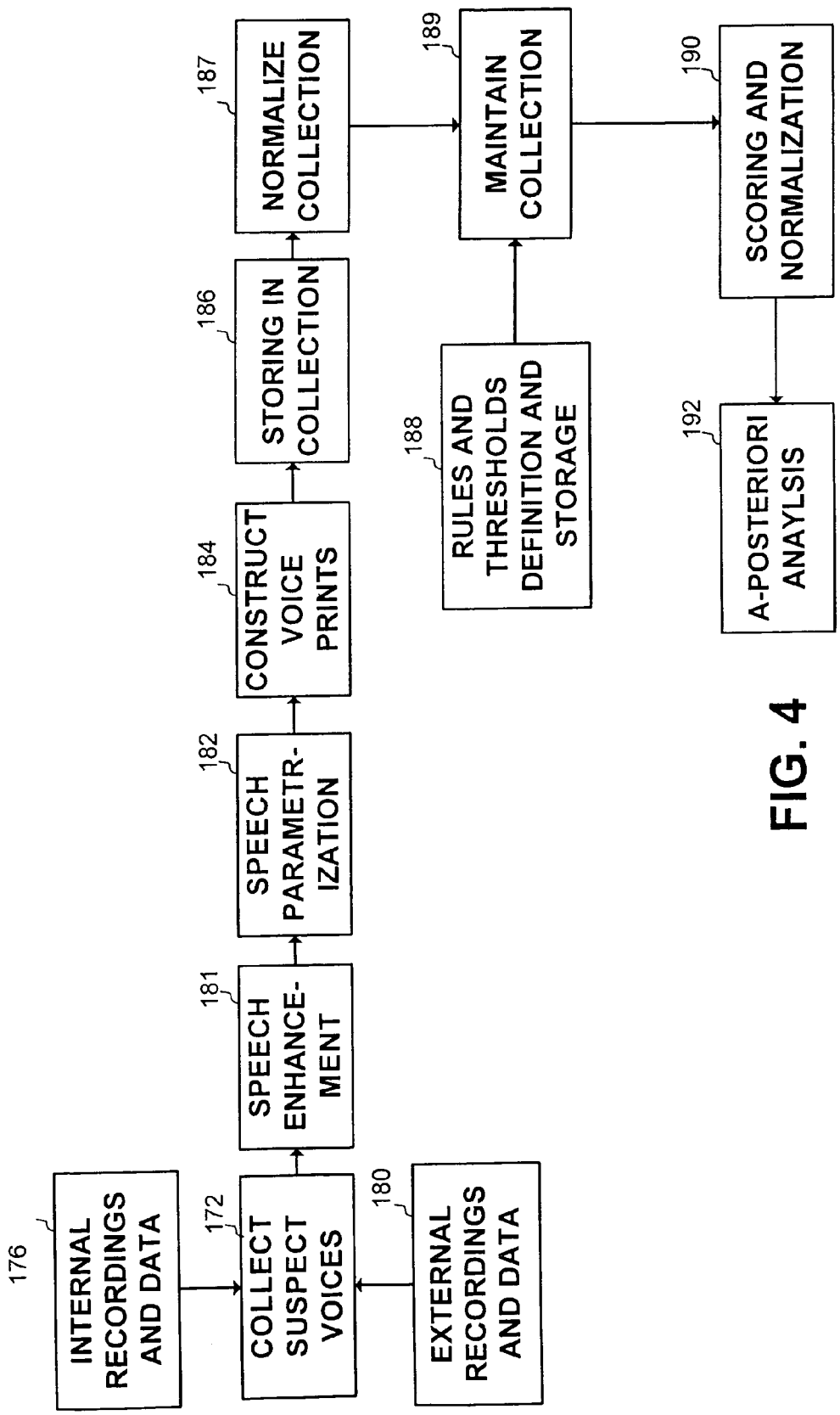
FIG. 4 is a schematic flow chart of the steps in building a fraudsters database, in accordance with the present invention.

Referring now to FIG. 4, showing a preferred embodiment of the process of constructing and using voice print collection 152 of FIG. 3. At step 172, relevant voice segments and additional data are collected. Relevant voice segments are preferably high quality recordings of audio containing speech by a known or suspected fraudster. The additional data comprises technical, demographic or other data, such as gender, age or age group, zip code, dialect, accent, area code the call was made from, type of equipment the caller was using, or the like. Furthermore, the data is not limited to types of information anticipated during the installation, and can comprise any other piece of data which will become available at a later time. Users are allowed to define their own set of data as a dynamic profile scheme, and set the rules regarding the voice collection filtering criteria accordingly. Hence the user can avoid sharing with a vendor of this invention the type of sensitive data that is to be collected and the rules associated with filtering the voice collection. This can be achieved, for example, by using XML, otherwise employing values and tags to label the values, or any other method. The voice segments and optionally the additional data are collected from any available source, either internal to the capturing and logging system as in step 176, or from an external source as in step 180. At step 181 the voice segments are enhanced if necessary, to obtain as good as possible voice quality. The enhancement comprises separating a summed or conference call. Additionally, the enhancement comprises adjusting the calls to the characteristics of the system. A preferred way of adjusting is compressing and decompressing the call with the same compressor/decompressor used by the apparatus, if the call is obtained from a foreign source and not from internal recording or capturing. The enhancement is substantially similar in nature to the method performed by pre processing component 144 of FIG. 3, which is detailed in association with FIG. 5 below. At step 182, the enhanced speech is transformed into a sequence of feature vectors. The features can include, but are not limited to, any subset of the following: LPC, Cepstrum, MFCC, Pitch and Energy. At step 184, voice prints are constructed from the feature vectors, based on statistical modeling. Each voice print is associated with the available data, such as the identity of the speaker, if available, or other data, and stored in the collection in step 186. In step 187, the collection is normalized, in order to mark a voice of a "wolf", i.e., a fraudster's voice which has common characteristics with many other voices in the collection and will therefore introduce inconsistencies to the scoring process. The normalization process generates score normalization parameters used when scoring the characteristics of a voice sample against one or more voice prints form the collection. The collection can be stored using any collection such as a file directory, a data base, commercially available data base products or the like. The collection is located remotely to the fraud detection component 140 or there within. At step 188, the data items, the rules, parameters and thresholds for affecting the steps associated with the disclosed invention, such as the selection of the voice prints for an interaction to be scored against, the risk level assessment and the like, are determined and stored. The data items, such as field names can be changed dynamically by the organization, and can even refer to fields that will become known only at a later time. The data can be stored together or separately from the voice prints. At step 189 the collection is maintained on an ongoing basis, including, for example, re-indexing, backups and the like. Steps 172, 182, 184, 186, 187, 188 and 189 are performed at the construction of the collection, or when new voices are added to the collection. At step 190 a suspect feature vector time sequence extracted from the customer side of a suspect call is checked against one or more voice prints stored in the database (or a voice print constructed on-the-fly from an earlier recording of the alleged customer). This is done by scoring the feature vector time sequence against a certain voice print, and scoring the feature vector time sequence against a general model, for example a general customer model, a general model of speakers of the same gender, or the like, constructed from voices belonging to a relevant population. The ratio between the two scores, or another normalization involving the two scores, provides the conditional probability that the feature vectors indeed belong to a speaker associated with the voice print. A score-test normalization step is preferably used to provide a normalized score of a feature vector time sequence against multiple voice prints. In the score-test normalization, the scoring of a tested voice against multiple voice prints is analyzed. For example, if a tested voice has a higher than average score against multiple voice prints, the voice is deduced to have common characteristics with many voices, and therefore the scoring results are meaningless and do not provide information The tested feature vector time sequence can be scored against all or part of the voices stored in the collection, for example a male voice can be scored against only the voices known to belong to males according to the additional data collected at step 172, in order to save processing power, provide a fast response, and be able to check more interactions. In yet another alternative, the voice is scored against voice prints in the collection, and once a scoring result exceeds a predetermined threshold, no further scoring is performed. In case the suspect voice is a "wolf", i.e., it has common characteristics with multiple voices in the collection, the results are vertically normalized to detect the true maximal similarity between the voice and a voice in the collection. Collaboration between multiple companies, by sharing fraudster databases is a preferred embodiment of the disclosed invention. When this option is used, a suspected call is tested against all or part of the voice prints in multiple databases, thus increasing the probability of locating a fraud attempt in case the fraudster committed an earlier fraud attempt relating to a different company. Alternatively, multiple companies can establish a common fraudster database, containing voice prints of all fraudsters known to all participating companies. In yet another preferred embodiment, the proposed invention can be based on a query portal, web services or any other method of client server oriented approach wherein a query is made against a central, possibly third-party, database of identified voice collection and returns one or more possible matches for a given voice sample along with a risk score, or a confidence level. In this method, each organization only manages its interactions and has limited or no access to the voice print collection. In yet another preferred alternative, each organization has full view or update privileges upon the voice collection database and can add new voice samples to the collections to the database. Each organization can preferably employ policy rules specific to his organization regarding how to filter the voice collection and how to set the risk level and confidence level. Step 190 is performed whenever a suspect call is transferred to the system. Preferably, after a predetermined period of time during which the system is used, a-posteriori analysis is performed at step 192. During the analysis, the system seeks common denominators to interactions in which a high fraud probability is detected, or to interactions that were reported as fraud attempts. The common denominators, such as certain voice characteristics, problematic area codes, calls script scenario or others can then be used to fine-tune the system parameters for subsequent usage. Manually or automatically feeding back data into the system, such as real fraud attempts, or other details and re-analyzing the data can be used for enhancing and adapting the parameters, rules, thresholds, weights, filtering engines usage, and other factors used throughout the fraud detection process. The a-posteriori analysis can also provide insights and enable trend analysis, patterns of behavior recognition or the like.

Figure 5:
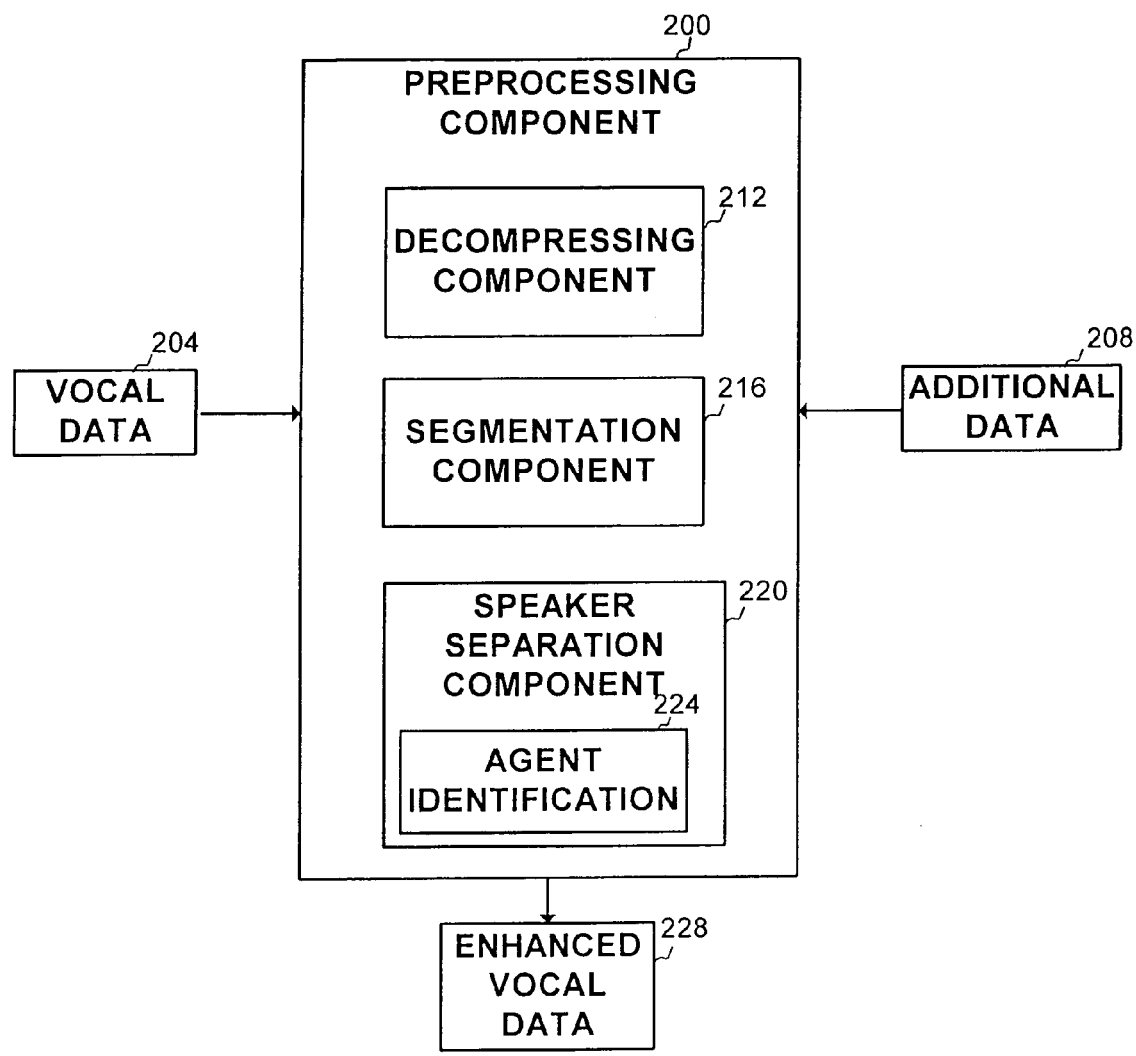
FIG. 5 is a schematic block diagram of the pre processing component of the fraud detection system, in accordance with the present invention.

Reference is now made to FIG. 5, showing the main components of the pre-processing components, 144 or 116 of FIG. 3. The pre processing system, generally referenced as 200, receives vocal data 204, consisting in the general case of conversations between customers and service provider representatives, or other persons associated with users of the apparatus and method of the present invention. System 200 further receives additional data or meta data 208, such as, but not limited to the identity, gender, age of the agent or the customer, computer telephony integration (CTI) information such as hold periods, transfers and the like, telephone numbers involved, and technical data such as type and audio characteristics of the used equipment, such as echo level, feedback level, channel distortion, background noise, or the like. The purpose of the meta data is to enhance and catalyze the operation of the engines that receive the interaction following the preprocessing. For example, by cutting hold periods containing music, out of an interaction, the word spotting engine processing this interaction will provide more accurate results in shorter time, since the interaction has been shortened.

In a preferred embodiment of the disclosed invention, system 200 comprises a decompressing component, for decompressing the voice data in case it was compressed when captured or recorded. The decompression is associated with the employed compression algorithm, such as G729, G726, G723.1 or the like. Decompressing is preferably adaptable to support multiple compression algorithms. System 200 further comprises a segmentation component, which filters out non-speech parts of the conversation. The filtering can be based upon CTI events such as hold, music, tones, DTMF or the like, as well as on analysis of the voice, including for example energy level analysis or speech detection, thus removing music on the customer side, background noises and the like. In the general case, where the two participants of a conversation are recorded together, there is a need to separate the sound tracks, so features characteristic of one side can be reliably extracted from the sound segment. To that end, system 200 comprises a speaker separation component 220. Speaker separation component 220 preferably searches for at least two areas in the voice segment whose characteristics are substantially different, assumes that each area belongs to one speaker, and tries to look for additional areas with similar characteristics for each speaker. Therefore, it is important to remove all non-speech areas from the voice segment, because such areas introduce mistakes both in the initial choice of the areas and during the expansion of the voice segments. In addition, the separation is highly sensitive to the initial choice of the starting points within the voice segment, where the system looks for the two sides of the conversation, meaning that a poor choice of starting points can cause separation which is mostly erroneous, containing for example music as one side, the same speaker on both sides or other errors. Additional difficulty arises since even if the separation is performed well, it is difficult to tell the agent side from the customer side. Therefore, speaker separation component 220 further comprises an agent identification component 224. Agent identification component 224 uses the audio characteristics of the environment, as extracted from a multiplicity of agent recordings using the standard equipment of the environment, to build a general agent model, which is characteristic to the environment. Given an interaction to separate, the system first looks for an area in the interaction whose extracted characteristics are as similar as possible to the general agent model of the environment. Then, the system looks for an area which is as different as possible from the first area. This enhanced mechanism reduces the errors stemming from wrong initial choice of areas, and from erroneous expansion, thus improving the overall accuracy of the speaker segmentation, and yielding a higher quality one-sided voice segment known to belong to the customer. The customer voice is then more reliably scored against known suspect voice prints. Other methods of selecting a starting point include but are not limited to using screen events related to agent operations, customer feedback such as answering questions, spotting words such as compliance phrases or the like.

The disclosed invention provides an apparatus and method for identifying a fraud attempt and decreasing the time between the execution of an identity theft and its detection, by locating interactions made by known fraudsters. The first stage is to locate suspected calls, using a rule engine, a human operator, filtering engines or a combination of the above. The calls that are determined by the first stage as suspected are assigned an initial fraud probability and are then transferred to a fraud detection component. The fraud detection component first tries to score a parameterized voice sample taken from the interaction against a voice print of allegedly the same speaker. If the score is below a certain threshold, there is a non-negligible probability that the speaker is a fraudster. In such case, the system scores the voice against voice prints in a collection of voice prints that are known to belong to fraudsters. If a combination of the initial fraud probability, and the similarity between the voice in the interaction and a voice in the reservoir exceeds a predetermined threshold it is reported, and steps are taken to control or contain the damage caused by the fraudster. In some business types, such as insurance, the customer side is more likely to be checked for fraudsters, while in others, such as trading floors the agent side is to be checked as well. Either at the selection stage or at the fraud detection stage, the voice is preprocessed. Preprocessing includes decompression in case the voice is compressed, removal of non-speech segments, separating the two or more speakers and selecting a specific side, if the two sides were captured together. The apparatus and method are efficient, since they enable users to focus on those calls that pose the greatest threats to their business, for example opening a new account, changing details of an existing account and the like. The disclosed system and apparatus can be operated in conjunction with a capturing or logging system, or as an independent solution receiving calls from a third party.

It will be appreciated by persons skilled in the art that many embodiments and alternatives exist to the disclosed invention. Various filtering engines can be used, including speech to text engines, text analysis engines, and others. Different voice enhancements can be performed upon the voice in order to improve its quality and the accuracy of later processing performed upon it. During the comparison stage, more, less, or different features can be extracted form the voice, and the voice print can be constructed in various ways. In addition, the scoring of a voice sample against a voice print can be performed in additional ways, such as giving more weight to certain features than to other features, or the like. Additionally, the methods described hereinabove can be generalized to include other interaction types, such as a face-to-face meeting in a walk-in center, an internet transaction or the like. The rules and thresholds for selecting the calls and for combining the results can also be implemented in a variety of ways.

It will also be appreciated by persons skilled in the art that the system can be used as a plug-in, i.e. an addition to an existing capturing or recording system. The employment of the proposed apparatus does not dictate changes in the environment, but rather an addition for fraud detection purposes.

It will also be appreciated by persons skilled in the art that the present invention is not limited to what has been particularly shown and described hereinabove. Rather the scope of the present invention is defined only by the claims which follow.

The invention claimed is:

1. A fraud detection method for generating a first fraud or fraud attempt probability, within an at least one captured or recorded interaction, the method comprising:
    a scoring step for scoring an at least one voice belonging to an at least one tested speaker in the at least one captured or recorded interaction against an at least one voice print within an at least one entry in a voice print collection, the scoring step generating an at least one probability that the at least one voice in the captured or recorded interaction belongs to an at least one second speaker associated with the at least one voice print, said at least one probability represents the probability that the at least one captured or recorded interaction is fraudulent; and
    an auditing step for auditing the at least one probability and the at least one captured or recorded interaction.

2. The method of claim 1 wherein the probability generated at the scoring step represents the similarity between the voice of the tested speaker and the voice of the at least one second speaker.

3. The method of claim 1 wherein the at least one second speaker is at least one item selected from the group consisting of: a fraudster; a legitimate speaker; and allegedly the tested speaker.

4. The method of claim 1 further comprising a fraud probability generation step, for enhancing the first fraud or fraud attempt probability.

5. The method of claim 4 wherein the fraud probability generation step employs a rule engine activating an at least one rule or using an at least one threshold set by a user of the method.

6. The method of claim 5 wherein said at least one rule or at least one threshold involves data associated with: the captured or recorded interaction; a speaker thereof; an at least one other interaction of the speaker thereof; the at least one voice print; or the at least one second speaker.

7. The method of claim 5 wherein the at least one rule or the at least one threshold is set dynamically.

8. The method of claim 1 further comprising:
    a second scoring step for determining a second scoring result by scoring the at least one voice against a background model; and
    a normalizing step for normalizing the first scoring result with the second scoring result.

9. The method of claim 1 wherein the scoring step comprises scoring the tested voice against at least two voice prints, thus obtaining at least two score results.

10. The method of claim 9 further comprising a score-test normalization step, for normalizing the at least two score results.

11. The method of claim 1 wherein the at least one voice print or data associated with the at least one voice print or with the second speaker is stored in a collection.

12. The method of claim 1 further comprising:
   a retrieving step for retrieving an at least one second interaction; and
   a construction step for constructing the at least one voice print from an at least one voice participating in the at least one second interaction.

13. The method of claim 1 further comprising a step of retrieving an at least one voice print or retrieving data associated with the at least one voice print.

14. The method of claim 13 further comprising a filtering step for filtering a collection to retrieve the at least one voice print such that data associated with the at least one voice print is related to data associated with the at least one recorded or captured interaction.

15. The method of claim 14 wherein the filtering is based on an at least one item selected from the group consisting of: dynamic data associated with the at least one voice recorded or captured interaction, dynamic data associated with the at least one voice print, predetermined data associated with the at least one voice recorded or captured interaction, predetermined data associated with the at least one voice print, area code of calling number, gender of speaker, age of speaker, and language spoken.

16. The method of claim 1 wherein the steps are performed in real-time.

17. The method according to claim 1 further comprising a pre processing step for pre processing the captured or recorded interaction.

18. The method of claim 17 wherein the pre processing step comprises at least one item selected from the group consisting of: compressing; decompressing; segmenting; separating speakers; identifying the agent side; and receiving data related to the at least one captured or recorded interaction.

19. The method of claim 18 wherein the data related to the at least one captured or recorded interaction comprises computer telephony integration information.

20. The method according to claim 12 further comprising a pre processing step for pre processing the at least one second interaction.

21. The method of claim 1 further comprising a selection step for selecting an at least one selected interaction to be transferred to the scoring step, and associating the at least one selected interaction with a second fraud or fraud attempt probability.

22. The method of claim 21 wherein the selection step comprises at least one item selected from the group consisting of: applying an at least one rule by a rule engine; auditing interactions; and filtering interactions using an at least one filtering engine.

23. The method of claim 22 wherein the at least one filtering engine comprises at least one item selected from the group consisting of: emotion detection, word spotting, speech to text, interaction analysis, and data risk analysis.

24. The method of claim 21 wherein the second fraud or fraud attempt probability represents a risk level associated with the at least one selected interaction.

25. The method of claim 21 wherein the selection step employs an at least one rule or an at least one threshold set by a user of the method.

26. The method of claim 25 wherein said rule or threshold involves data associated with at least one items elected from the group consisting of: the captured or recorded interaction; a speaker thereof; other interactions of the speaker thereof; the at least one voice print, and the at least one second speaker.

27. The method of claim 25 wherein the at least one rule or the at least one threshold is set dynamically.

28. The method of claim 21 further comprising a weighting step for generating a combined fraud attempt probability from the first and the second fraud attempt probabilities.

29. The method according to claim 1 further comprising an alert-generation step for generating an alert if said first fraud or fraud attempt probability exceeds a predetermined threshold.

30. The method of claim 29 wherein the alert is sent to an agent or another contact associated with the captured or recorded interaction.

31. The method according to claim 21 further comprising an alert-generation step for generating an alert if said first fraud or fraud attempt probability or said second fraud or fraud attempt probability or a combination thereof exceeds a predetermined threshold.

32. The method according to claim 1 further comprising a reporting step for generating or updating a report comprising details of the at least one captured or recorded interaction if said first fraud or fraud attempt probability exceeds a predetermined threshold.

33. The method of claim 32 wherein auditing comprises auditing the report.

34. The method of claim 33 wherein auditing the report comprises at least one item selected from the group consisting of: listening to calls; reviewing interactions; reviewing history of at least one speaker participating in an at least one interaction; listening to previous interactions of speakers participating in an at least one interaction appearing in the report, and filling forms.

35. The method according to claim 21 further comprising a reporting step for generating or updating a report comprising details of the at least one captured or recorded interaction if said first fraud or fraud attempt probability or said second fraud or fraud attempt probability or a combination thereof exceeds a predetermined threshold.

36. The method of claim 1 further comprising a step of interaction capturing or logging.

37. The method of claim 1 further comprising a step of a-posteriori analysis for at least one item selected from the group consisting of: adapting an at least one parameter or an at least one rule or an at least one threshold used by the method, trend analysis, pattern of behavior recognition, and selecting an at least one filtering engine.

* * * * *